United States Patent
Masuda et al.

(10) Patent No.: US 7,026,023 B2
(45) Date of Patent: Apr. 11, 2006

(54) PROTECTIVE LAYER TRANSFER SHEET AND PRINTED PRODUCT

(75) Inventors: Kazuhiro Masuda, Tokyo-To (JP); Makoto Hashiba, Tokyo-To (JP)

(73) Assignee: Dai Nippon Printing Co., Ltd., Tokyo-To (JP)

( * ) Notice: Subject to any disclaimer, the term of this patent is extended or adjusted under 35 U.S.C. 154(b) by 0 days.

(21) Appl. No.: 10/946,580

(22) Filed: Sep. 21, 2004

(65) Prior Publication Data

US 2005/0079341 A1   Apr. 14, 2005

(30) Foreign Application Priority Data

Sep. 25, 2003   (JP) ............................. 2003-332637

(51) Int. Cl.
  *B41B 5/40*   (2006.01)
(52) U.S. Cl. ................. 428/32.69; 428/32.71; 428/32.74; 428/32.77; 428/32.79
(58) Field of Classification Search ............ 428/32.69, 428/32.71, 32.74, 195, 32.77, 32.79
See application file for complete search history.

(56) References Cited

U.S. PATENT DOCUMENTS 6,291,062 B1 *   9/2001   Oshima et al. ............. 428/323

\* cited by examiner

*Primary Examiner*—Rena Dye
*Assistant Examiner*—Timothy M. Speer
(74) *Attorney, Agent, or Firm*—Harness, Dickey & Pierce, P.L.C.

(57) ABSTRACT

The present invention provides a protective layer transfer sheet, which has excellent folding resistance, plasticizer resistance, scratch resistance, transparency, layer transferability and other properties, and a print using the same. The protective layer transfer sheet comprises: a substrate sheet; and a thermally transferable resin layer provided separably on at least a part of one side of the substrate sheet. The thermally transferable resin layer comprises at least a thermally transferable protective layer and a heat-sensitive adhesive resin layer stacked in that order from the substrate sheet side. The thermally transferable protective layer comprises a layer comprising submicron particles of a layered inorganic material dispersed in a binder resin. The print is formed using the thermally transferable protective layer.

4 Claims, 1 Drawing Sheet

PROTECTIVE LAYER TRANSFER SHEET AND PRINTED PRODUCT

TECHNICAL FILED

The present invention relates to a protective layer transfer sheet comprising a separably provided protective layer and a print using the same. More particularly, the present invention relates to a protective layer transfer sheet that is used for providing a protective layer on an image formed by thermal transfer recording, an image formed by ink jet recording, or an image formed by electrophotographic recording and is excellent in folding resistance, plasticizer resistance, scratch resistance, transparency, layer transferability and other properties, and a print using the same.

BACKGROUND ART

Various printing methods, which have hitherto been extensively used for full-color image formation, include: a sublimation dye thermal transfer method wherein a dye contained in a colorant layer is transferred by thermal sublimation and diffusion onto an image-receiving sheet; a thermal ink transfer method wherein a colorant layer is melt and softened upon heating and as such is transferred onto an image-receiving sheet; an ink jet recording method; and electrophotography.

They are utilized, for example, in many booklets such as passports, identification cards, driving licenses, commuter's tickets, and membership cards, and in the preparation of cards and photographs for business, or in printers of personal computers or video printers.

In the case of prints formed by thermal dye transfer (sublimation dye thermal transfer) and ink jet recording, however, when they are brought into contact with solvents, chemicals and the like such as water and alcohols which are near at hand, or when they are stored in contact with plasticizer-containing card cases, file sheets, plastic erasers or the like, images are blurred, or otherwise, dyes are transferred onto these articles resulting in contamination of the card cases, or discoloration by light.

A method known for protecting the above images against solvents, chemicals or the like is to transfer a thermally transferable resin layer using a protective layer transfer sheet comprising a thermally transferable resin layer with a thermal head, a heating roll or the like to form a protective layer.

Regarding this protective layer transfer sheet, for example, Japanese Patent Laid-Open No. 240404/2002 discloses a technique for providing a protective layer transfer sheet characterized by comprising a substrate sheet and a thermally transferable protective layer provided on at least a part of one side of the substrate sheet, the protective layer being a laminate having a structure of at least two layers of a layer composed mainly of at least an acrylic resin and a layer composed mainly of a polyester resin provided in that order on the substrate sheet.

However, for example, in a field of ID cards in which letter information and an image of a facial photograph should remain unchanged or should not be deteriorated for a long period of time, durability such as folding resistance and scratch resistance, plasticizer resistance, transparency, layer transferability and the like which are further superior to those in the protective layer transfer sheet described in the above publication are desired.

DISCLOSURE OF THE INVENTION

An object of the present invention is to provide a protective layer transfer sheet that is used for providing a protective layer on an image formed by thermal transfer recording, an image formed by ink jet recording, or an image formed by electrophotographic recording and is excellent in folding resistance, plasticizer resistance, scratch resistance, transparency, layer transferability and other properties, and a print using the same.

The above object can be attained by a protective layer transfer sheet characterized by comprising: a substrate sheet; and a thermally transferable resin layer provided separably on at least a part of one side of the substrate sheet, wherein said thermally transferable resin layer comprises at least a thermally transferable protective layer and a heat-sensitive adhesive resin layer formed in this order from said substrate sheet side, and said thermally transferable protective layer comprises a layer comprising submicron particles of a layered inorganic material dispersed in a binder resin.

Further, in the above construction, the protective layer transfer sheet according to the present invention is characterized in that the thermally transferable resin layer and at least one of a thermally sublimable colorant layer and a heat-fusion colorant layer are provided in a face serial manner on an identical substrate sheet.

Further, according to the present invention, there is provided a print characterized by comprising a thermally transferred image covered with a layer formed by transfer of a thermally transferable resin layer from the above protective layer transfer sheet.

The print of the present invention is characterized in that the image is one formed by thermal transfer recording, one formed by ink jet recording, or one formed by electrophotographic recording.

The present invention can provide a protective layer transfer sheet that is used for providing a protective layer on an image formed by thermal transfer recording, an image formed by ink jet recording, or an image formed by electrophotographic recording and is excellent in folding resistance, plasticizer resistance, scratch resistance, transparency, layer transferability and other properties, and a print using the same.

BEST MODE FOR CARRYING OUT THE INVENTION

Next, the present invention will be described in more detail with reference to the following embodiments.

Figure 1:
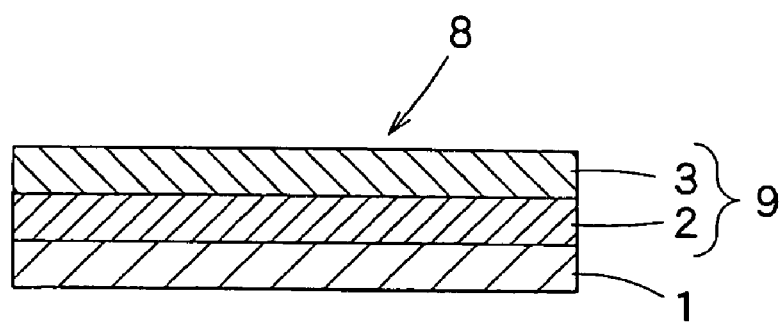
FIG. 1 is a cross-sectional view illustrating one embodiment of the protective layer transfer sheet according to the present invention.

FIG. 1 is a cross-sectional view illustrating one embodiment of the protective layer transfer sheet according to the present invention. The protective layer transfer sheet according to the present invention comprises a substrate sheet 1 and a thermally transferable resin layer 9 provided on one side of the substrate sheet 1. The thermally transferable resin layer 9 comprises a thermally transferable protective layer 2 and a heat-sensitive adhesive resin layer 3 formed in this order as viewed from the substrate sheet 1 side.

In the protective layer transfer sheet 8 in the above embodiment of the present invention, the thermally transferable protective layer 2 comprises a layer comprising fine particles of submicron size of a layered inorganic material dispersed in a binder resin. Fine particles of submicron size refer to fine particles having a size of not less than 0.01 μm and less than 1 μm in diameter.

The thermally transferable protective layer 2 has a structure in which fine particles of submicron size of a layered inorganic material are arranged parallel to one another with short interparticle spacing.

This construction can provide a protective layer transfer sheet having excellent folding resistance, plasticizer resistance, scratch resistance, transparency, layer transferability and other properties.

Figure 2:
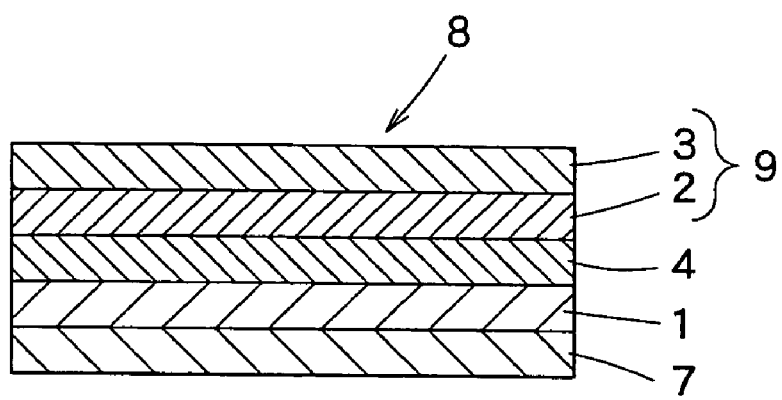
FIG. 2 is a cross-sectional view illustrating another embodiment of the protective layer transfer sheet according to the present invention.

FIG. 2 is a cross-sectional view showing another embodiment of the protective layer transfer sheet 8 according to the present invention. The protective layer transfer sheet 8 includes a heat-resistant slip layer 7 provided on one side of a substrate sheet 1. A thermally transferable protective layer 2 and a heat-sensitive adhesive resin layer 3 are stacked in that order, as viewed from the substrate sheet side, on the other side of the substrate sheet 1.

A release layer 4 may be provided between the substrate sheet 1 and the thermally transferable protective layer 2. Upon a transfer operation, the release layer 4 remains unremoved on the substrate sheet side.

Furthermore, the provision of a heat resistant slip layer 7 on the protective layer transfer sheet on its side remote from the thermally transferable resin layer 9 can prevent the protective layer transfer sheet from sticking to a thermal head, a hot plate for transfer or the like of a printer and further can improve slipperiness.

Figure 3:
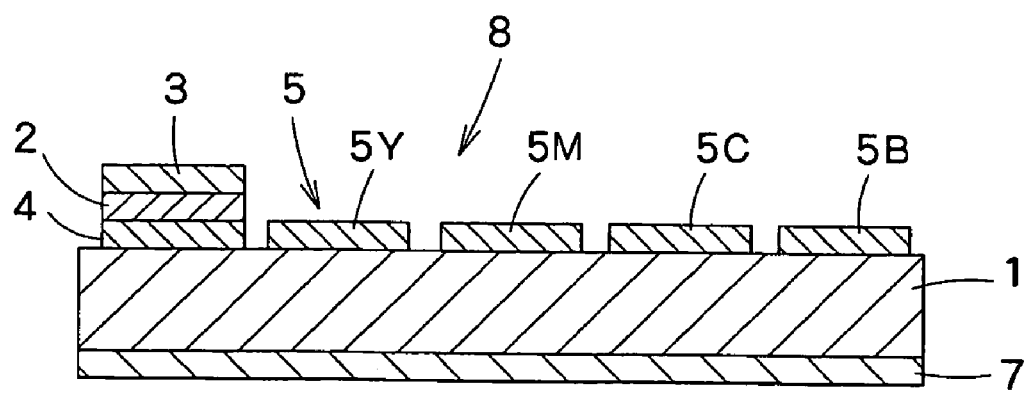
FIG. 3 is a schematic cross-sectional view illustrating a further embodiment of the protective layer transfer sheet according to the present invention.

FIG. 3 is a schematic cross-sectional view showing still another embodiment of the protective layer transfer sheet 8 according to the present invention. The protective layer transfer sheet 8 shown in FIG. 3 is a composite type protective layer transfer sheet. This transfer sheet includes a substrate sheet 1 and, provided on one side of the substrate sheet 1 in the following order in a face serial manner, a thermally transferable resin layer 9 and thermally sublimable colorant layers 5 of hues of yellow, magenta, cyan, and black (5Y, 5M, 5C, and 5B). A heat-resistant slip layer 7 is provided on the other side of the substrate sheet 1. The thermally transferable resin layer 9 comprises a thermally transferable protective layer 2 and a heat-sensitive adhesive resin layer 3 formed on top of each other.

Further, as with the protective layer transfer sheet 8, a release layer 4 may be provided on the substrate sheet 1 from the viewpoint of regulating the separability of the thermally transferable protective layer 2 from the substrate sheet 1.

The protective layer transfer sheet 8 according to the present invention is not limited to the above embodiments and may be, for example, a composite type protective layer transfer sheet comprising a thermally transferable protective layer and a heat-fusion colorant layer(s) and a composite type protective layer transfer sheet comprising a thermally transferable protective layer, a thermally sublimable colorant layer(s), and a heat-fusion colorant layer(s) that may be properly selected depending upon the purpose of use and the like.

In particular, in the case of the composite type protective layer transfer sheet, image formation by thermal transfer and the transfer of a protective layer onto an object can be simultaneously carried out.

It should be noted that the drawings are provided for illustrative purposes only and are not intended to limit the invention in any way.

Each layer constituting the protective layer transfer sheet will be further described in more detail.

[Substrate Sheet]

In the protective layer transfer sheet of the present invention, any substrate sheet may be used as the substrate sheet 1 without particular limitation so far as the substrate sheet has film strength and heat resistance comparable to substrate sheets used in conventional thermal transfer sheets.

Specific examples of substrate sheets usable herein include films of plastics, for example, polyester resin films such as polyethylene terephthalate resin films, polycarbonate resin films, polyamide resin films, polyimide resin films, cellulose acetate resin films, polyvinylidene chloride resin films, polyvinyl chloride resin films, polystyrene resin films, fluororesin films, polypropylene resin films, polyethylene resin films, and ionomers. Further, for example, composite films or sheets formed by stacking two or more of the above films on top of each other or one another may also be used.

The thickness of the substrate sheet may be properly varied depending upon materials for the substrate sheet so that the substrate sheet has proper strength and heat resistance. In general, however, the thickness is preferably about 1 to 100 μm.

[Thermally Transferable Protective Layer]

The thermally transferable protective layer 2 according to the present invention has a structure in which fine particles of submicron size of a layered inorganic material are arranged parallel to one another with short interparticle spacing in the binder resin. Specifically, the spacing between the fine particles of a layered inorganic material is not less than 0.01 μm and less than 1 μm, preferably not less than 0.01 μm and not more than 0.1 μm.

According to this construction, the thermally transferable protective layer 2 advantageously has excellent folding resistance, plasticizer resistance, scratch resistance, layer transferability and the like.

When fine particles of the layered inorganic material not satisfying the above requirement are dispersed in the binder resin, the binder resin interposed between the fine particles is freely moved without being bound and, consequently, the folding resistance, the plasticizer resistance, the scratch resistance, the layer transferability and the like are not disadvantageously developed.

If necessary, wax, ultraviolet absorbers, antioxidants, fluorescent brighteners and the like may further be added.

The above effect can be developed by selecting a suitable material from binder resins, ultrafine particles of a layered inorganic material and the like which will be described later, or by regulating, for example, the amount of these additives added and the thickness of the thermally transferable protective layer.

[Binder Resin]

The binder resin constituting the thermally transferable protective layer 2 may be any binder resin so far as it is colorless and transparent and can disperse the fine particles of the layered inorganic material. For example, the thermally transferable protective layer 2 may contain at least one binder resin selected from epoxy curable resins, for example, ultraviolet curable resins including radically polymerizable resins such as monofunctional or polyfunctional acrylate compounds, polyamide resins, polyester resins, polycarbonate resins, polystyrene resins, polyurethane resins, butyral resins, phenoxy resins, polyvinyl alcohol resins, acetic acid-based vinyl resins, acryl vinyl ether resins, alkyl vinyl ether resins, maleic acid copolymer resins, polyvinylpyrrolidone resins, cellulosic resins, polyvinylidene chloride resins, water-soluble alkyd resins, non-cellulosic water-soluble polysaccharides, ethylene-vinyl alcohol copolymers, and copolymers of a groups of these resins. Among them, acrylic resins are particularly preferred.

[Particles of Layered Inorganic Material]

The particles of a layered inorganic material constituting the thermally transferable protective layer 2 may be any one so far as the particles have a submicron size (not less than 0.1 µm and less than 1 µm) and can be homogeneously dispersed in the binder resin.

In particular, the diameter of the particles is preferably not more than 200 nm from the viewpoint of excellent transparency.

Further, the layered inorganic material preferably has an aspect ratio (ratio between thickness and diameter of flat sheet) of not more than 100.

For example, one or at least two metal oxides selected from particle diameter-regulated titanium oxide, zinc oxide, magnesium oxide, tin oxide, indium oxide, silicon oxide and the like, ITO, ceramics, oxides comprising two or more metals used in superconductors and the like, clay minerals (clay) and the like may be used.

Clay minerals include, for example, kaolinite, dickite, nacrite, halloysite, antigorite, chrysotile, pyrophyllite, montmorillonite, hectorite, tetrasilicic mica, sodium taeniolite, muscovite, margarite, talc, vermiculite, phlogopite, xanthophyllite, and chlorite. They may be naturally occurring clay minerals or synthetic clay minerals.

In particular, for example, smectite clay minerals such as montmorillonite and hectorite and synthetic mica such as Na-type tetrasilicon fluorine mica and Li-type fluorine taeniolite are preferred.

The thermally transferable protective layer 2 may be formed by coating such as gravure coating, gravure reverse coating, or roll coating.

The thickness of the thermally transferable protective layer 2 is preferably in the range of 0.5 to 5.0 g/cm$^2$ on a dry basis.

[Heat-Sensitive Adhesive Resin Layer]

In the present invention, the heat-sensitive adhesive resin layer 3 is formed for improving transferability and adhesion of a transferred protective layer onto a print as an object.

Resins usable for the heat-sensitive adhesive resin layer 3 include, for example, acrylic resins, vinyl chloride resins, vinyl acetate resins, vinyl chloride-vinyl acetate copolymer resins, styrene-acryl copolymer resins, polyester resins, and polyamide resins.

When an ultraviolet absorber is incorporated in the heat-sensitive adhesive resin layer 3, lightfastness and weathering resistance of an image covered with the transferred protective layer can be improved.

Specific examples of ultraviolet absorbers usable herein include a wide range of organic ultraviolet absorbers, for example, salicylate, benzophenone, benzotriazole, substituted acrylonitrile, nickel chelate, and hindered amine. These ultraviolet absorbers may contain ultraviolet absorbing resins into which an addition polymerizable double bond such as a vinyl group, an acryloyl group or a methacryloyl group, or a functional group such as an alcoholic hydroxyl group, an amino group, a carboxyl group, an epoxy group, or an isocyanate group has been introduced.

Further, additives such as antioxidants and fluorescent brighteners may also be incorporated.

The heat-sensitive adhesive resin layer 3 may be formed by the same method as in the thermally transferable protective layer 2, that is, conventional means such as gravure coating, gravure reverse coating, or roll coating. The thickness of the heat-sensitive adhesive resin layer 3 is preferably in the range of 0.5 to 5.0 g/cm$^2$ on a dry basis.

[Heat Resistant Slip Layer]

Further, in the protective layer transfer sheet according to the present invention, as shown in FIG. 2, if necessary, a heat resistant slip layer 7 may be provided on the substrate sheet 1 in its side remote from the thermally transferable resin layer 9 from the viewpoints of preventing sticking to a thermal head of a printer, a hot plate for transfer or the like and improving the slip properties.

For example, a resin prepared by curing a butyral resin or the like with an isocyanate compound or a silicone resin, as such may be used for constituting the heat resistant slip layer 7. The thickness of the heat resistant slip layer may be about 0.1 to 10 µm.

[Release Layer]

When the thermally transferable resin layer 9 cannot be separated from the substrate sheet without difficulties, a release layer may be formed between the substrate sheet and the thermally transferable protective layer 2.

Materials usable for the formation of the release layer include, for example, various waxes such as silicone wax, and resins such as silicone resin, fluororesin, acrylic resin, polyurethane resin, polyvinyl pyrrolidone resin, polyvinyl alcohol resin, and polyvinyl acetal resin.

The release layer may be properly selected from a type which is transferred onto an object upon thermal transfer, a type which is left on the substrate sheet side upon thermal transfer, a type which is subjected to cohesive failure and the like. From the viewpoints of excellent surface gloss, transfer stability of the protective layer and the like, however, the type is preferably such that the release layer is non-transferable and, upon thermal transfer, remains on the substrate sheet side so that the interface between the release layer and the protective layer serves as the surface of the protective layer after the thermal transfer.

The release layer may be formed in the same manner as in the thermally transferable protective layer 2, that is, by conventional means such as gravure coating, gravure reverse coating, or roll coating. The thickness of the release layer is preferably in the range of 0.5 to 5.0 g/m$^2$ on a dry basis.

When a protective layer, which becomes matte upon transfer, is desired, the incorporation of various particles in the release layer or matting treatment of the surface of the release layer on the protective layer side can provide a protective layer having a matte surface.

It should be noted that, when the releasability of the protective layer from the substrate sheet is good, there is no need to provide the release layer. In this case, upon thermal transfer, the protective layer can be released directly from the substrate sheet.

In the present invention, the thermally transferable resin layer 9 may be provided solely on the substrate sheet 1 to form a protective layer transfer sheet comprising the thermally transferable protective layer 2 and the heat-sensitive adhesive resin layer 3 only. Alternatively, for example, thermal transfer ink layers, such as thermally sublimable dye ink layers of yellow, magenta, and cyan or a heat-fusion type transfer ink layer of black (containing carbon black), may be arranged in a face serial manner on an identical substrate to form an integral transfer sheet comprising thermal transfer ink layers and a thermally transferable resin layer 9 arranged in a face serial manner on an identical substrate.

In the case of the integral transfer sheet, the plate pattern is not particularly limited. For example, a transfer film with the following layer patterns being repeatedly provided in a face serial manner may be mentioned (In the following description, for colors, yellow is referred to as "Ye", magenta as "Mg", cyan as "Cy", and black as "Bk"): (1) Ye dye layer, Mg dye layer, Cy dye layer, and thermally transferable protective layer, (2) Ye dye layer, Mg dye layer, Cy dye layer, Bk dye layer, and thermally transferable protective layer, (3) Ye dye layer, Mg dye layer, Cy dye layer, Bk heat-fusion ink layer, and thermally transferable protective layer, (4) Bk dye layer and thermally transferable resin layer, and (5) Bk heat-fusion ink layer and thermally transferable resin layer.

In these plate patterns, the size of the Bk dye layer, the Bk heat-fusion ink layer, and the thermally transferable protective layer may be larger than the other layers.

A detection mark for detecting each layer may be provided anywhere in each layer. For example, it may be provided at the head of each layer area or at the head in the color in the front position.

In the integral transfer sheet comprising the above thermal transfer ink layers and a thermally transferable resin layer, registration in these predetermined patterns followed by overprinting is necessary. In this case, an additive, such as a fluorescent brightener, may be incorporated into each layer to permit the registration to be easily performed visually or in a mechanical detection manner upon ultraviolet irradiation or the like.

Regarding the thermal transfer ink layers, inks and methods for the thermal transfer sheet as such may be used for the material of the ink used, the method for providing the ink on the surface of the substrate sheet and the like.

The image protected by using the above protective layer transfer sheet may be any of an image formed by thermal dye transfer and/or thermal ink transfer, an image formed by ink jet recording, and an image formed by electrophotographic recording.

The object on which the thermally transferable resin layer is transferred from the protective layer transfer sheet according to the present invention is not particualrly limited. Examples of objects usable herein include those having images such as letters or symbols formed by thermal dye transfer, thermal ink transfer, ink jet recording, or electrophotographic recording using a thermal transfer sheet or a composite type protective layer transfer sheet comprising a thermally transferable resin layer and dye or heat-fusion colorant layers on image-receiving sheets and card substrates formed of plastic sheets of polyester resins, vinyl chloride resins, vinyl chloride-vinyl acetate copolymer resins, polycarbonates, and acrylic resins, or thermal transfer image-receiving sheets comprising a dye-receptive resin layer (an image-receiving layer) on a substrate sheet described below, or films, sheets, or molded products of the above resins.

Substrate sheets usable for the above objects include synthetic papers, wood free paper, art paper, coat paper, cast coated paper, wall paper, backing paper, paper impregnated with a synthetic resin solution or an emulsion, paper impregnated with a synthetic rubber latex, paper with a synthetic resin being internally added thereto, paperboard, and natural fiber papers such as cellulose fiber papers, and films or sheets of various resins such as polyolefin resins, polyvinyl chloride resins, polyethylene terephthalate resins, polystyrene resins, polymethyl methacrylate resins, and polycarbonate resins. Any laminate of the above materials may also be used.

Among them, synthetic papers having on their surface a highly heat insulating microvoid layer are preferred.

Further, additives such as coloring pigments, white pigments, extender pigments, fillers, ultraviolet absorbers, antistatic agents, thermal stabilizers, antioxidants, fluorescent brighteners and the like may be optionally incorporated on the surface of the object.

Further, previously or after image recording on the object, a magnetic recording layer, an optical memory, an IC memory, a bar code and the like may be formed on the surface thereof.

A color image and/or a letter image are formed on an image-receiving sheet, a card or the like by using a thermal transfer sheet by means of a thermal printer, and a thermally transferable protective layer is transferred thereon using the protective layer transfer sheet according to the present invention to form a protective layer. Alternatively, the protective layer transfer sheet according to the present invention, having a thermal transfer ink layer may be used.

In the transfer, separate thermal printers may be used under separate conditions for the thermal dye transfer, the heat-fusion transfer, and the transfer of the protective layer. Alternatively, a single printer may be used while properly regulating printing energy for each of transfer operation.

In the protective layer transfer sheet according to the present invention, heating means is not limited to the thermal printer, and other heating means, such as a hot plate, a hot stamper, a hot roll, a line heater, and an iron may also be used.

The thermally transferable protective layer may be transferred on the whole surface of the formed image or on a desired area of the image.

The protective layer transfer sheet according to the present invention can be used for thermal transfer to prepare cards such as identification (ID) cards, various certificates, and license having a transferred protective layer that is excellent in folding resistance, plasticizer resistance, scratch resistance, transparency, layer transferability and the like.

EXAMPLES

Example 1

The following Examples and Comparative Example further illustrate the present invention.

A 6 μm-thick polyethylene terephthalate film (substrate sheet) having a heat-resistant slip layer on its backside is provided. A coating liquid for a release layer was coated onto the substrate sheet on its side remote from the heat-resistant slip layer, and the coating was then dried to form a release layer.

Next, a coating liquid for a transferable protective layer having the following composition was coated on the release layer, and the coating was then dried to form a transferable protective layer.

Further, a coating liquid for a heat-sensitive adhesive resin layer having the following composition was coated on the transferable protective layer, and the coating was then dried to form a heat-sensitive adhesive resin layer. Thus, a protective layer transfer sheet of Example 1 having a layer construction of "heat-sensitive adhesive resin layer/transferable protective layer/release layer/substrate sheet/heat resistant slip layer" was prepared.

[Coating Liquid for Release Layer]

| | |
|---|---|
| Silicone-modified acrylic resin (CELTOP 226, solid content 50%, manufactured by Daicel Chemical Industries, Ltd.) | 16 pts. wt. |
| Aluminum catalyst (CELTOP CAT-A, solid content 10%, manufactured by Daicel Chemical Industries, Ltd.) | 3 pts. wt. |
| Methyl ethyl ketone | 8 pts. wt. |
| Toluene | 8 pts. wt. |

[Coating Liquid for Transferable Protective Layer]

| | |
|---|---|
| Acrylic resin (BR-87, manufactured by Mitsubishi Rayon Co., Ltd.) | 100 pts. wt. |
| Fine particles of layered inorganic material (montmorillonite, thickness 1 to 20 nm, length 100 to 200 nm) | 5 pts. wt. |
| Methyl ethyl ketone | 210 pts. wt. |
| Toluene | 210 pts. wt. |

[Coating Liquid for Heat-Sensitive Adhesive Resin Layer]

| | |
|---|---|
| Polyester resin (RV700, manufactured by Toyobo Co., Ltd.) | 100 pts. wt. |
| Methyl ethyl ketone | 200 pts. wt. |
| Toluene | 200 pts. wt. |

The coverage for each layer on a solid basis was as follows.
Release layer: 0.7 g/m²
Transferable protective layer: 1.5 g/m²
Heat-sensitive adhesive resin layer: 1.5 g/m².

Example 2

A protective layer transfer sheet of Example 2 was formed in the same manner as in Example 1, except that the ratio of the components in the coating liquid for the transferble protective layer in Example 1 was varied as follows.

[Coating Liquid for Transferable Protective Layer]

| | |
|---|---|
| Acrylic resin (BR-87, manufactured by Mitsubishi Rayon Co., Ltd.) | 100 pts. wt. |
| Fine particles of layered inorganic material (montmorillonite, thickness 1 to 20 nm, length 100 to 200 nm) | 10 pts. wt. |
| Methyl ethyl ketone | 220 pts. wt. |
| Toluene | 220 pts. wt. |

Example 3

A protective layer transfer sheet of Example 3 was formed in the same manner as in Example 1, except that the ratio of the components in the coating liquid for the transferable protective layer in Example 1 was varied as follows.

[Coating Liquid for Transferable Protective Layer]

| | |
|---|---|
| Acrylic resin (BR-87, manufactured by Mitsubishi Rayon Co., Ltd.) | 100 pts. wt. |
| Fine particles of layered inorganic material (montmorillonite, thickness 1 to 20 nm, length 100 to 200 nm) | 20 pts. wt. |
| Methyl ethyl ketone | 240 pts. wt. |
| Toluene | 240 pts. wt. |

Example 4

A protective layer transfer sheet of Example 4 was formed in the same manner as in Example 1, except that the ratio of the components in the coating liquid for the transferable protective layer in Example 1 was varied as follows.

[Coating Liquid for Transferable Protective Layer]

| | |
|---|---|
| Acrylic resin (BR-87, manufactured by Mitsubishi Rayon Co., Ltd.) | 100 pts. wt. |
| Fine particles of layered inorganic material (montmorillonite, thickness 1 to 20 nm, length 100 to 200 nm) | 30 pts. wt. |
| Methyl ethyl ketone | 260 pts. wt. |
| Toluene | 260 pts. wt. |

Next, a print was prepared by printing an image on a vinyl chloride card (hereinafter referred to as "VC card") (85.5 mm in length×54.0 mm in width×0.8 mm in thickness) using a thermal dye transfer (sublimation type thermal transfer) sheet of three colors of yellow Ye, magenta Mg, and cyan Cy with a printer (card printer P310, manufactured by Eltron).

The protective layer transfer sheet of Example 1 was put on top of the image formed by the above method, and the thermally transferable resin layer was transferred with the same printer used above to prepare a print, with a protective layer, having a layer construction of "transferable protective layer/heat-sensitive adhesive resin layer/sublimation transferred colorant layer/VC card."

Likewise, prints with a protective layer were prepared using the protective layer transfer sheets of Examples 2 to 4.

Comparative Example 1

A protective layer transfer sheet of Comparative Example 1 was formed in the same manner as in Example 1, except that the fine particles of the layered inorganic material were not added to the coating liquid for a transferable protective layer in Example 1 and the ratio of the other components in the coating liquid was varied as follows.

[Coating Liquid for Transferable Protective Layer]

| | |
|---|---|
| Acrylic resin (BR-87, manufactured by Mitsubishi Rayon Co., Ltd.) | 100 pts. wt. |
| Methyl ethyl ketone | 200 pts. wt. |
| Toluene | 200 pts. wt. |

Next, a print with a protective layer was prepared in the same manner as in Example 1.

For the prints with a protective layer of Examples 1 to 4 and Comparative Example 1 prepared above, the scratch resistance, the folding resistance, and the plasticizer resistance were evaluated by the following evaluation methods and based on the following evaluation criteria.

[Scratch Resistance]

For the above prints onto which the protective layer had been transferred, a 300-revolution test was carried out with ROTARY ABRASION TESTER (manufactured by Toyo Seiki Seisaku Sho, Ltd.) under conditions of truck wheel CS-10 and load 500 g to visually evaluate the durability.

[Evaluation Criteria]
○: Good and no image breaking
Δ: Part of image deteriorated
X: Image broke.

[Folding Resistance]

For the above prints onto which the protective layer had been transferred, folding was carried out 300 times for obverse and reverse/length and width (1200 times in total). In this case, in the longitudinal direction, folding was carried out to 73 mm to 61 mm, and in the lateral direction, folding was carried out to 54 mm to 50 mm. Thereafter, DOP was coated with #10 wire bar on the surface of the protective layer.

After coating, the protective layer was covered with a polyethylene sheet, followed by storage in an environment of 40° C. for 8 hr to inspect the state of a deterioration in image caused by the plasticizer. The folding resistance was evaluated according to the following criteria.

[Evaluation Criteria]
○: Good and no image breaking
Δ: Part of image deteriorated
X: Image broke.

[Plasticizer Resistance]

For cards as prints onto which the protective layer had been transferred, a plasticizer-loaded flexible VC sheet (Arutoron, manufactured by Mitsubishi Chemical Corporation, #480, thickness 400 μm) and the transferred object were put on top of each other. Further, a load of 70.2 g per cm² was applied to the assembly, and the assembly was stored in an environment of 82° C. for 32 hr to visually evaluate damage to prints caused by the plasticizer.
○: No damage
Δ: Transfer of small amount of dye onto flexible VC sheet
X: Transfer of large amount of dye onto flexible VC sheet

TABLE 1

|  | Scratch resistance | Folding resistance | Plasticizer resistance |
| --- | --- | --- | --- |
| Ex. 1 | Δ | Δ | Δ |
| Ex. 2 | Δ | Δ | Δ |
| Ex. 3 | Δ | ○ | ○ |
| Ex. 4 | Δ | ○ | ○ |
| Comp. Ex. 1 | X | X | X |

As is apparent from the results shown in Table 1, the prints with a protective layer of Examples 1 to 4 were superior to the print with a protective layer of Comparative Example 1 (conventional product) in scratch resistance, folding resistance, and plasticizer resistance, and were comparable with the conventional product in layer transferability and transparency.

The invention claimed is:

1. A protective layer transfer sheet comprising:
a substrate sheet; and
a thermally transferable resin layer provided separably on at least a part of one side of the substrate sheet,
wherein said thermally transferable resin layer comprises at least a thermally transferable protective layer and a heat-sensitive adhesive resin layer formed in this order from said substrate sheet side, and
said thermally transferable protective layer comprises a layer comprising submicron particles of a layered inorganic material dispersed in a binder resin, the layered inorganic material being arranged parallel to one another in the binder resin.

2. The protective layer transfer sheet according to claim 1, wherein at least one of a thermally sublimable colorant layer and a heat-fusion colorant layer are provided on the same surface of the substrate sheet where the thermally transferable resin layer is provided.

3. A print comprising a thermally transferred image covered with a layer formed by transfer of a thermally transferable resin layer from the protective layer transfer sheet according to claim 1 or 2.

4. The print according to claim 3, wherein said image is one formed by thermal transfer recording, one formed by ink jet recording, or one formed by electrophotographic recording.

* * * * *